United States Patent
Choi et al.

(10) Patent No.: US 9,830,884 B2
(45) Date of Patent: Nov. 28, 2017

(54) MULTI-DISPLAY DEVICE, DISPLAY SYSTEM INCLUDING THE SAME AND DISPLAY METHOD THEREOF

(71) Applicant: SAMSUNG ELECTRONICS CO., LTD., Suwon-si (KR)

(72) Inventors: Kyoung-oh Choi, Seoul (KR); Jeong-moon Byun, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 6 days.

(21) Appl. No.: 14/735,713

(22) Filed: Jun. 10, 2015

(65) Prior Publication Data

US 2016/0180812 A1    Jun. 23, 2016

(30) Foreign Application Priority Data

Dec. 22, 2014    (KR) .......................... 10-2014-0186169

(51) Int. Cl.
*G09G 5/00*    (2006.01)
*G09G 5/12*    (2006.01)
*G06F 3/14*    (2006.01)

(52) U.S. Cl.
CPC ............. *G09G 5/12* (2013.01); *G06F 3/1446* (2013.01); *G09G 2300/026* (2013.01); *G09G 2310/0205* (2013.01); *G09G 2320/02* (2013.01); *G09G 2340/04* (2013.01); *G09G 2340/0492* (2013.01); *G09G 2356/00* (2013.01); *G09G 2360/04* (2013.01); *G09G 2370/16* (2013.01)

(58) Field of Classification Search
CPC ... G09G 2300/026; G09G 5/12; G06F 3/1446

USPC ......................................................... 345/1.3
See application file for complete search history.

(56) References Cited

U.S. PATENT DOCUMENTS 6,774,868 B1    8/2004    Bowen
7,136,040 B1 *  11/2006   Park ..................... G09G 3/3666
                                                           345/100

(Continued)

FOREIGN PATENT DOCUMENTS

JP    2001-222269 A    8/2001
JP    2006-330329 A    12/2006

(Continued)

OTHER PUBLICATIONS

International Search Report dated Mar. 29, 2016 issued by the International Searching Authority in counterpart International Application No. PCT/KR2015/014068.

(Continued)

*Primary Examiner* — Adam J Snyder
(74) *Attorney, Agent, or Firm* — Sughrue Mion, PLLC

(57) ABSTRACT

A display device included in a display system and a control method of the display device are provided. The display device includes a communication interface configured to receive an input image, an image processor configured to process an image of the input image to be displayed, a display configured to display the processed image, and a controller configured to control the display to display the processed image in a scanning direction that is opposite to a scanning direction of an adjacent display device that is disposed adjacent to the display device in the display system based on an arrangement position of the display device within the display system.

18 Claims, 19 Drawing Sheets

(56) References Cited

U.S. PATENT DOCUMENTS

| | | | |
|---|---|---|---|
| 2001/0013904 A1 | 8/2001 | Kubota et al. | |
| 2005/0057434 A1* | 3/2005 | Youn | G06F 3/1446 345/1.3 |
| 2005/0219147 A1* | 10/2005 | Sato | G06F 3/1431 345/1.1 |
| 2006/0145941 A1* | 7/2006 | Park | G06F 3/1446 345/1.1 |
| 2009/0015513 A1* | 1/2009 | Kim | G06F 3/1446 345/1.3 |
| 2009/0160731 A1* | 6/2009 | Schuler | G06F 3/1423 345/1.1 |
| 2010/0001925 A1 | 1/2010 | Kim et al. | |
| 2010/0097379 A1* | 4/2010 | Choi | G09G 5/363 345/428 |
| 2010/0144283 A1* | 6/2010 | Curcio | G06F 1/1626 455/66.1 |
| 2011/0007091 A1* | 1/2011 | Homma | G06F 3/1431 345/619 |
| 2011/0164065 A1* | 7/2011 | Mate | G06F 3/1446 345/676 |
| 2013/0038508 A1* | 2/2013 | Min | G09G 5/006 345/1.1 |
| 2013/0100181 A1* | 4/2013 | Choe | G09G 3/3666 345/691 |
| 2013/0222722 A1* | 8/2013 | Zhao | G09G 5/36 345/1.3 |
| 2015/0294614 A1* | 10/2015 | Duan | G09G 3/3666 345/214 |

FOREIGN PATENT DOCUMENTS

| | | | | |
|---|---|---|---|---|
| JP | 2013-117601 A | | 6/2013 | |
| JP | 2013142868 A | * | 7/2013 | G09G 3/36 |
| KR | 10-2006-0023832 A | | 3/2006 | |
| KR | 1020090132435 A | | 12/2009 | |

OTHER PUBLICATIONS

Written Opinion dated Mar. 29, 2016 issued by the International Searching Authority in counterpart International Application No. PCT/KR2015/014068.

Communication dated Jun. 1, 2016 issued by the European Patent Office in counterpart European Application No. 15200406.5.

Communication dated Sep. 26, 2016, issued by the European Patent Office in counterpart European Application No. 15200406.5.

* cited by examiner

MULTI-DISPLAY DEVICE, DISPLAY SYSTEM INCLUDING THE SAME AND DISPLAY METHOD THEREOF

CROSS-REFERENCE TO RELATED APPLICATION(S)

This application claims priority from Korean Patent Application No. 10-2014-0186169, filed on Dec. 22, 2014 in the Korean Intellectual Property Office, the entire disclosure of which is incorporated herein by reference.

BACKGROUND

1. Field

Apparatuses and methods consistent with exemplary embodiments relate to a display device, a display system including the same, and a display method thereof, and more particularly to a display device that can remove distortion that occurs in a region where two frames meet each other by controlling a scanning direction of the display device in association with at least one other display device in the display system.

2. Description of Related Art

In general, a display device displays an image on a screen. Recently display systems have been implemented which include multiple display devices or multiple display panels. A display system that is composed of multiple display devices is a technology that may display a single image simultaneously using the multiple display devices, for example, for the purposes of advertisement, entertainment, sports, broadcasting, and the like. As another example, a display system composed of the multiple display devices may display the same image on multiple screens.

For example, the display system including the plurality of display devices may be operated in a manner such that the respective display devices display the same image or display different images that are combined to form one larger image as a whole in place of a larger screen, for example, that may be used at an exhibition or a conference.

The display system may sequentially transfer input images to the respective display devices or may individually transfer the input images to the respective display devices. Typically, a method for sequentially transferring the input images is used because a circuit configuration may be united and simplified and the cost may be reduced. In this example, a delay occurs whenever the input image passes through the display device. As a result of this delay there occurs a difference between images that are reproduced by the plurality of display devices included in the display system. This results in interruptions in the display, In general, a panel that is included in a display device may sequentially display an image from an upper end to a lower end of the panel, or from the lower end to the upper end of the panel. In this example, an amount of time that is required to display the image from the uppermost end to the lowermost end (or vice versa) of the panel is in proportion to a frame rate of the panel. For example, if the frame rate is 60 Hz, 120 Hz, or 240 Hz, the required amount of time becomes 17.6 ms, 8.8 ms, or 4.4 ms, which is referred to as a scanning delay. Because of the scanning delay, based on a specific time, a frame that is displayed at the uppermost end of the panel may be displayed at a different than a frame that is displayed at the lowermost end of the panel. For example, when image frames are displayed on two display devices that are arranged up and down in a display system with respect to each other, even though the display devices may be synchronized in a region at which the two display devices meet each other, distortion may still occur in the region at which the two frames meet each other. Such distortion may be caused by a scanning delay that occurs in the respective display devices.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a display device, a display system including the same, and a display method thereof, which can remove distortion that occurs in a region at which two frames meet. For example, distortion can be removed through controlling of a scanning direction of the display devices constituting the display system.

According to an aspect of an exemplary embodiment, there is provided a display device from among a plurality of display devices included in a display system, the display device including a communication interface configured to receive an input image; an image processor configured to process an image of the input image to be displayed; a display configured to display the processed image; and a controller configured to control the display to display the processed image in a scanning direction that is opposite to a scanning direction of an adjacent display device that is disposed adjacent to the display device in the display system based on an arrangement position of the display device within the display system.

The display device may be arranged at a position rotated 180° relative to a display direction of the adjacent display device, and the image processor may rotationally process the image to invert the image on the display of the display device.

The display may divide the processed image into a plurality of regions, and may have a first scan mode for updating the divided regions in a direction from top to bottom of the display and a second scan mode for updating the divided regions in a direction from bottom to top of the display, and the controller may control the display to display the processed image in the second scan mode.

In response to the adjacent display device rotationally processing the image, the controller may control the display to display the image that is processed by the image processor with a delay for a predetermined amount of time.

The display device may further include a user interface configured to receive an input of a user identifying an arrangement position on the display system of the display device, and the controller may control the display to display the processed image in the scanning direction that is opposite to the scanning direction of the adjacent display device based on the received arrangement position.

The display device may further include a sensor configured to sense an arrangement direction of the display device, and the image processor may rotationally process the image to be displayed on the display device according to the sensed arrangement direction.

The controller may set a position delay time based on the arrangement position of the display device within the display system, and, in response to the communication interface receiving the input image, the controller may control the display to display the processed image after the position delay time elapses.

The communication interface may receive the input image from the adjacent display device.

The communication interface may transmit the received input image to the adjacent display device.

According to an aspect of another exemplary embodiment, there is provided a display system including a first display device configured to display an upper region of an input image; and a second display device arranged below the first display device and which is configured to display a lower region of the input image that is on a lower portion of the input image than the upper region, wherein scanning directions of the first display device and the second display device may be opposite to each other in mutually vertical directions.

The first display device may be arranged at a position rotated 180° relative to the second display device and may rotationally process the image to be displayed on the first display device by inverting the image.

According to an aspect of another exemplary embodiment, there is provided a display method of a display device from among a plurality of display devices included in a display system, the method including receiving an input image; processing an image of the input image to be displayed; and displaying on the display device the processed image in a scanning direction that is opposite to a scanning direction of an adjacent display device that is disposed adjacent to the display device in the display system, based on an arrangement position of the display device within the display system.

The display device may be arranged at a position rotated 180° relative to a display direction of the adjacent display device, and the processing may include rotationally processing the image to invert the image on a display of the display device.

The displaying may include dividing the processed image into a plurality of regions, wherein the display device may have a first scan mode for updating the divided regions in a direction from top to bottom of the display device and a second scan mode for updating the divided regions in a direction from bottom to top of the display device, and displaying the processed image in the second scan mode.

In response to the adjacent display device rotationally processing a respective image, the displaying may include displaying the processed image with a delay for a predetermined amount of time.

The display method may further include receiving an input of an arrangement position of the display device within the display system, and the displaying may include displaying the processed image in the scanning direction that is opposite to the scanning direction of the adjacent display device based on the received arrangement position.

The display method may further include sensing an arrangement direction of the display device, and the processing may include rotationally processing the image to be displayed on the display device according to the sensed arrangement direction.

The displaying may include setting a position delay time based on the arrangement position of the display device within the display system, and, in response to the input image being received, the displaying may include displaying the processed image after the position delay time elapses.

The receiving may include receiving the input image from the adjacent display device.

The display method may further include transmitting the received input image to the adjacent display device.

According to an aspect of another exemplary embodiment, there is provided a computer readable medium having recorded thereon a computer program that is executable by a computer to perform a method according to one or more exemplary embodiments.

BRIEF DESCRIPTION OF THE DRAWINGS

The above and/or other aspects will be more apparent from the following detailed description of certain exemplary embodiments when taken in conjunction with the accompanying drawings, in which.

DETAILED DESCRIPTION

Figure 1:
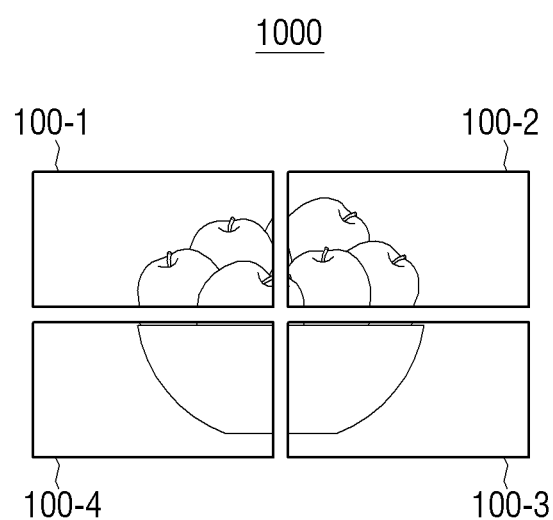
FIGS. 1 and 2 are diagrams illustrating a display system including a plurality of display devices according to exemplary embodiments.

Hereinafter, exemplary embodiments of the present disclosure to achieve the above-described technical subjects are described. However, the present disclosure is not limited to the exemplary embodiments disclosed hereinafter, but can be implemented in diverse forms. For example, the matters defined in the description, such as the detailed construction and elements, are examples provided to assist those of ordinary skill in the art in a comprehensive understanding of the disclosure, and the present disclosure is only defined within the scope of the appended claims. In describing the present disclosure, well-known element structures and technologies are not described in detail because they would obscure the disclosure in unnecessary detail.

Although terms such as "first, second, and so forth" are used to describe diverse elements, components and/or sections, such elements, components and/or sections are not limited by the terms. The terms are used only to discriminate an element, component, or section from other elements, components, or sections.

The terms used to explain the exemplary embodiments are not intended to limit the scope of the present disclosure. In the description, a singular expression may include a plural expression unless specially described. The term "includes" and/or "is composed of" as used in the description refers to one or more other components, steps, and operations, and the existence or addition of elements are not excluded in addition to the described components, steps, operation and/ or elements.

In the exemplary embodiments of the present disclosure, the term "module" or "portion", as used herein, refers to, but is not limited to, a software or a hardware component or a combination thereof, which performs certain tasks. Further, "a plurality of modules or portions" may be integrally formed as at least one module and may be implemented by at least one processor except for "modules" or "portions" that are not to be implemented by specific hardware.

One or more exemplary embodiments relate to a multipanel display system and control method thereof in which a scanning direction of the individual display panels can be controlled to reduce image distortion that occurs when the individual display panels display images at certain times due to scanning delay. For example, the direction in which individual panels performing scanning can be controlled, thereby creating less distortion.

Scanning refers to how an image is drawn or painted on an electronic screen. The picture on the screen is made up of a number of horizontal lines, for example, 480 horizontal lines, which are divided into two sets, odd numbers and even numbers. Interlaced scanning refers to a process in which the lines that make up the picture on a TV screen are drawn in an alternating fashion. To display an image, the television sequentially draws all of the odd numbered lines from top to bottom and then proceeds to fill in the even lines. As an example, the process may occur at a rate of 30 frames per second, meaning the entire process only takes around 1/30 of a second. Most older TVs rely on interlaced scanning.

An alternative way of displaying images is known as a progressive scan and it has been designed for more modern display devices such as HDTVs and other displays that use Thin Film Transistor (TFT) monitors. digital cameras, and the like. Progressive scan refers to a process in which the lines that make up the TV picture are displayed all at once, in sequence. What differentiates a progressive scan from an interlaced scan is that the progressive scans system draws every line on the screen in just one pass, rather than in two passes. Each line is filled in sequential order instead of alternating odd and then even order lines such as in the interlaced scan. This results in a faster refresh rate, for example, once every 1/60th of a second.

One or more exemplary embodiments herein relate to a display apparatus and method which reduce image distortion between adjacent panels in a multi screen display by controlling the scanning of the respective panels.

FIG. 1 is a diagram illustrating a display system 1000 that includes a plurality of display devices according to an exemplary embodiment.

Referring to FIG. 1, display system 1000 includes a plurality of display devices 100-1, 100-2, 100-3, and 100-4. Here the respective display devices may simultaneously display the same image or may simultaneously display different images that are combined to form one image as a whole.

FIG. 1 illustrates an example of a system which includes four display devices 100-1, 100-2, 100-3, and 100-4 that may simultaneously display one image. In this example, a source of the image that is displayed on the four display devices 100-1, 100-2, 100-3, and 100-4 may be any one of the four display devices 100-1, 100-2, 100-3, and 100-4. As another example, the source of the image may be an external device that is connected to one or more of the display devices, such as a set-top box, a console, a control system, and the like.

For example, the first display device 100-1 may sequentially transmit an image that is stored in the first display device 100-1 to the second to fourth display devices 100-2, 100-3, and 100-4, and thus the four display devices 100-1, 100-2, 100-3, and 100-4 may display the same image.

A display system having such a chain structure as described above has the advantages in that the circuit configuration can be united and simplified and the cost can be reduced in comparison to a display system that has a parallel structure. However, the chain structure has problems in that a delay occurs whenever the image passes through one of the display devices, and thus, there occurs a difference in time between when the images are displayed on the respective display devices that are included in the display system.

According to an aspect of an exemplary embodiment, the above-described problems can be solved by setting of or otherwise controlling the delay times for the respective display devices. That is, in an example in which different delay times are set for the respective display devices 100-1, 100-2, 100-3, and 100-4, and the images are controlled to be displayed after the respective delay times elapse, the same frame can be simultaneously displayed on each of the four display devices 100-1, 100-2, 100-3, and 100-4. Accordingly, the images that are displayed on the four display devices 100-1, 100-2, 100-3, and 100-4 on the display system can be synchronized.

FIG. 1 illustrates an example in which four display devices 100-1, 100-2, 100-3, and 100-4 are used, however, this is merely for convenience of explanation, and it should be appreciated that the number of display devices that constitute the display system 1000 is not limited thereto.

Figure 2:
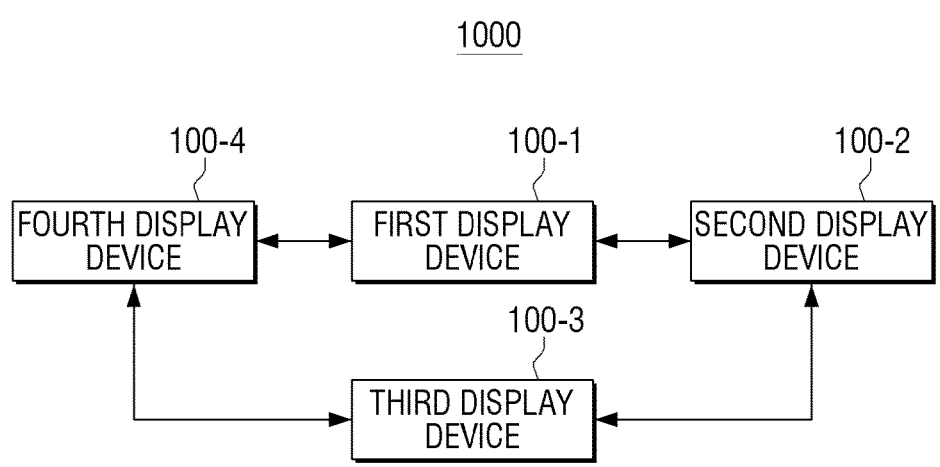

FIG. 2 illustrates the display system 1000 according to an exemplary embodiment. Referring to FIG. 2, the plurality of display devices 100-1, 100-2, 100-3, and 100-4 are connected to one another to send and receive various kinds of information, commands, and content.

FIG. 2 illustrates that the respective display devices are directly connected to the adjacent display devices, respectively. However, the exemplary embodiments are not limited thereto. As another example, all of the respective display devices may be directly connected to one another.

On the other hand, although FIG. 2 illustrates that the display devices are connected by one line, in some examples the connection of the display devices may be implemented through two or more communication paths. Also, communication between the display devices may be performed through a wireless communication method rather than a wired communication method. Examples of a transmission method are further described hereinafter.

In the example of FIG. 2, the first display device 100-1 can transmit and receive an image to and from second and fourth display devices 100-2 and 100-4, and vice versa. Also, in this example, the second and fourth display devices 100-2 and 100-4 can transmit and receive an image to and from the third display apparatus 100-3. In this example, the first display device 100-1 and the third display device 100-3 do not communicate directly with one another. Likewise, the second display device 100-2 and the fourth display device 100-4 do not communicate directly with one another. In this example, some of the display devices communicate directly with one another, while some of the display devices communicate indirectly with one another. In another words, some display devices use an intermediate display device to communicate with a target display device.

Figure 3:
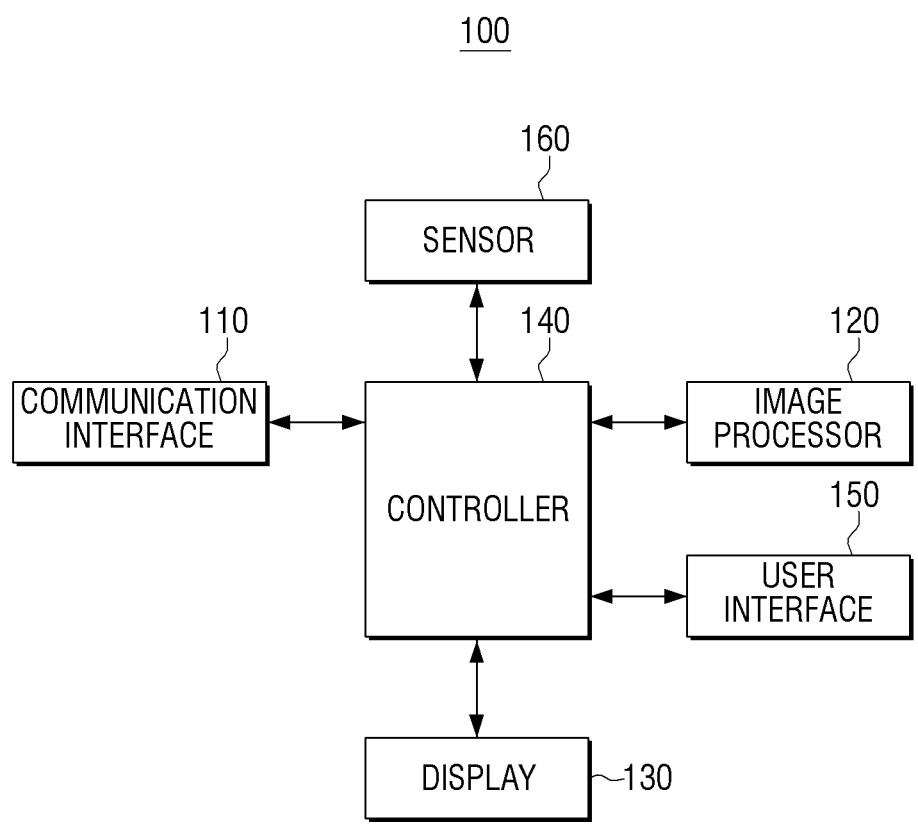
FIG. 3 is a block diagram illustrating a display device of a display system according to an exemplary embodiment.

Referring to FIG. 3, a display device 100 that that may be included in a display system according to various exemplary embodiments includes a communication interface 110, an image processor 120, a display 130, a controller 140, a user interface 150, and a sensor 160. For example, the display device 100 may correspond to the first through the fourth display devices 100-1 through 100-4 shown in FIGS. 1 and 2.

Also, the display device 100 may be used to control other display devices 100 that are included within the display system. For example, the display device 100 described with respect to FIG. 3 may be the display device 100-1 shown in FIG. 1. In this example, the display device 100 may be used to control the second through fourth display devices 100-2 through 100-4.

The communication interface 110 may communicate with an external device, and in particular, may perform communication with another display device. For example, the communication interface 110 may receive an input image from an external server (not illustrated) or another display device, or may transmit a received input image to another display device. As an example, the communication interface 110 can receive or transmit the input image using not only a wired communication method but also a wireless communication method. Examples of the communication interface 110 are described later with reference to FIGS. 4 and 5.

The image processor 120 may divide the input image that is received through the communication interface 110. For example, under the control of the controller 140, the image processor 120 may divide the input image in accordance with the number of display devices and the arrangement state thereof on the display system.

The image processor 120 may rotationally process the divided input images based on the arrangement positions of the display devices included in the display system. For example, if display device 100 is arranged in a direction that is different from a direction of another display device that is adjacent above or below with respect to the display device 100, the divided image may be rotationally processed. In this example, the display device 100 may be arranged to be rotated by 180° based on the display direction of the image. On the other hand, in this example, although it is described that an image is divided and the divided images are rotationally processed, it is also possible to divide a region to be displayed after the input image is rotationally processed.

The display 130 may display various kinds of images. For example, one of the divided images may be displayed on the display 130 based on the arrangement position of the display device in the display system. For example, in the case of a 2×2 display system, an upper left image from among the four divided images may be displayed on the display device that is positioned at upper left end.

Further, the display 130 may display an image through scanning of a frame in one direction. For example, the display 130 may scan the frame from the left to the right of the frame from the uppermost end to the lowermost end of the panel. For example, if the frame rate of the panel is 60 Hz, an amount of time that it takes to scan the frame from the uppermost end to the lowermost end of the panel becomes 17.6 ms. Due to such a scanning delay, image inconsistency may occur between the display devices, examples of which are described later with reference to FIGS. 7 and 8.

Further, the display 130 may divide the processed image into a plurality of regions. In this example, the display 130 may have a first scan mode for updating the divided regions in a direction from top to bottom and a second scan mode for updating the divided regions in a direction from bottom to top.

The user interface 150 may be used is to perform communication between the display device 100 and a user, and may provide the user with a menu capable of receiving an input of an arrangement position on the display system 1000 of the display device 100. Here, the user input may identify a position of the display device 100 within the display system 1000. For example, the user interface 150 may be provided in an on-screen display (OSD) manner, and may provide a list of all or part of the arrangement positions on the display system 1000. A user may select an arrangement position on the display system 1000 in the list through an input unit (not illustrated), such as a key panel, a remote controller, a voice recognition means, a motion input means, and the like.

The sensor 160 may sense an arrangement direction of the display device 100. For example, the sensor 160 may sense whether the display device 100 is arranged in a forward direction or is rotated by 180°. For example, the sensor 160 may include a geomagnetic sensor, and may sense whether the display device 100 is rotated using the geomagnetic sensor.

The controller 140 controls respective configurations in the display device 100. For example, the controller 140 may display one of the divided images on the basis of the arrangement position of the display device 100. Accordingly, the display devices 100 that are included in the display system 1000 may display images that correspond to their arrangement positions, and thus the display system 1000 may display one large combined screen as a whole.

Further, in an example in which the display device 100 is arranged such that it is inverted, the controller 140 may control the display 110 to invert and display one of the divided images. For example, if the display device 100 is inverted, a problem that may occur due to the scanning delay of the display devices arranged above and below the display device may be solved such as described with reference to the examples of FIGS. 7 and 8.

If an inversion mode is input through the user interface 150 or an inversion of the display device 100 is sensed through the sensor 160, the controller 140 may recognize that the display device 100 is arranged upside down and may invert and display the image accordingly.

As described above, the display device 100 in this example may perform a screen update in a region that is adjacent to the other display device at the same point in time, and thus a screen distortion between the two display devices due to the scanning delay may be prevented or otherwise reduced.

Although the example of FIG. 3 includes an input image that is received from the outside and is divided to be displayed, the display device may include a storage device and may display an image stored in the storage device. For example, the plurality of display devices may individually store the image, or only one display device may store the image and provide the stored image to other display devices.

Figure 4:
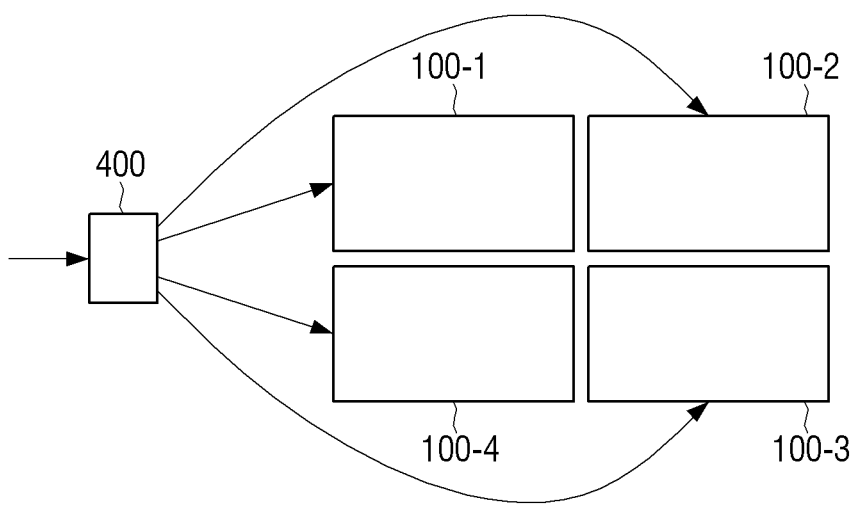
FIGS. 4 and 5 are diagrams illustrating examples of transmitting and receiving an input image of a display device according to an exemplary embodiment.
Figure 5:
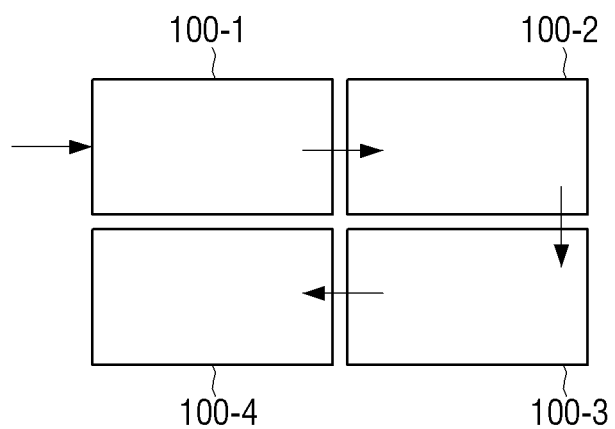

FIGS. 4 and 5 are diagrams illustrating examples of transmitting and receiving an input image of a display device according to exemplary embodiments. For example, the display device 100 may receive the input image through the communication interface 110, and in general, may receive the input image in a parallel or a chain manner with respect to other display devices included in a display system.

FIG. 4 is a diagram illustrating an example in which the display device 100 receives the input image in a parallel manner. In this example, a processor 400 is provided separately from the display devices of the display system and may be used to receive and divide the input image based on the number of the display devices and their arrangement with respect to each other. For example, the processor 400 may supply the divided input images to the respective display devices 100-1, 100-2, 100-3, and 100-4. Accordingly, the respective display devices 100-1, 100-2, 100-3, and 100-4 may simultaneously receive the divided images, and thus it is not necessary to synchronize the images displayed by the plurality of display devices. In this case, however, because a separate processor is used, an additional cost may occur and the circuit configuration may be more complicated.

FIG. 5 is a diagram illustrating an example in which the display device 100 receives the input image in a chain manner. For example, one display device such as display device 100-1 from among the four display devices 100-1, 100-2, 100-3, and 100-4 may receive the input image from an external device. In this example, the first display device 100-1 may transmit the input image to the second display device 100-2, and then the input image may be sequentially transmitted to the third and fourth display devices 100-3 and 100-4. In this example, the circuit configuration can be simplified and the cost may be reduced.

However, in this example a delay may occur in transmitting the image between the respective display apparatuses, and thus, the screens displayed on the display devices 100-1 through 100-4 may not coincide with one another. For example, the timing of the images may be different in the respective display apparatuses. Accordingly, the controller 140 may set delay times and operate to display the images after the delay times have elapsed to synchronize the screens that are displayed on each of the display devices. An example of a method for setting the delay times is described with reference to FIG. 11.

Figure 6:
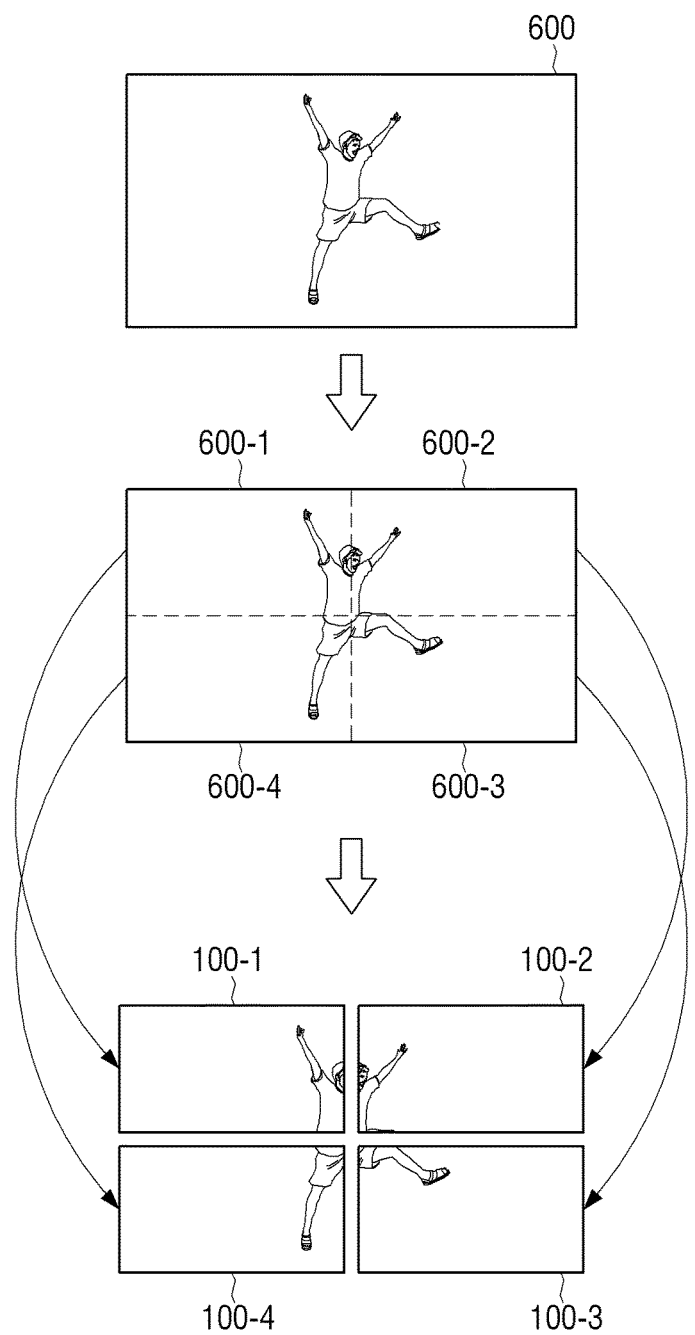
FIG. 6 is a diagram illustrating an example of dividing an input image according to an exemplary embodiment.

FIG. 6 is a diagram illustrating an example in which the image processor divides the input image according to an exemplary embodiment.

The communication interface 110 of a display device may receive the input image from the external device or another display device. Referring to FIG. 6, the input image may be one complete image 600. However, for the display system 1000 to display the large image, the respective display devices 100-1, 100-2, 100-3, and 100-4 may divide the image into partial screens and display the divided screens. Accordingly, the image processor 120 of a display device may divide the input image in consideration of the number and the arrangement of the display devices 100 that constitute the display system 1000.

For example, when the display system 1000 includes four display devices, the image processor 120 may divide the input image into four images 600-1, 600-2, 600-3, and 600-4. The controller 140 may display one of the divided images on the display 130 based on the arrangement position of the display device. As illustrated in the example of FIG. 6, the first image 600-1 of the four divided images may be displayed on the first display device 100-1, and the second to fourth images 600-2, 600-3, and 600-4 may be displayed on the second to fourth display devices 100-2, 100-3, and 100-4, respectively.

Accordingly, the result is that one large image is displayed using the four display devices 100-1, 100-2, 100-3, and 100-4 which are organically combined with one another.

Figure 7:
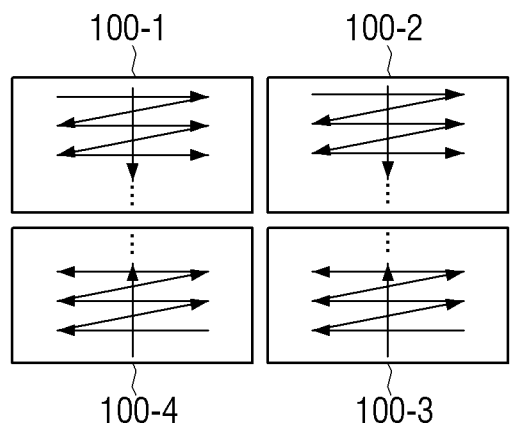
FIGS. 7 and 8 are diagrams illustrating examples of image scanning directions of a display device according to exemplary embodiments.

FIG. 7 is a diagram illustrating an example of scanning an image according to an exemplary embodiment.

Referring to FIG. 7, the display 130 may display an image based on a method of scanning respective frames to display the image on the panel. For example, the display 130 may scan the frames from left to right or from right to left, starting from an uppermost end to the lowermost end of the panel. As another example, the display 130 may scan the frames from left to right or from right to left, starting from the lowermost end to the uppermost end of the panel. In this example, a delay occurs while one frame is being displayed on one panel. This delay is referred to as a scanning delay.

The scanning delay is in proportion to the frame rate of the panel. In general, if the frame rate is 60 Hz, a scanning delay of 17.6 ms occurs, and as the frame rate is increased to 120 Hz and 240 Hz, the scanning delay is inversely decreased to 8.8 ms and 4.4 ms, respectively.

In order to solve the scanning delay, according to various exemplary embodiments, the controller 140 of a display device may scan a respective image in a direction that is different from the direction in which an adjacent display device scans another respective image. For example, if the first display device 100-1 scans the image from top to bottom, the fourth display device 100-4 may scan the image from bottom to top. In this example, the frames displayed by the first display device 100-1 and the fourth display device 100-4 come in contact with each other at a bottom edge of the first display device 100-1 and a top edge of the fourth display device 100-4. As a result, the edges of the first and fourth display devices 100-1 and 100-4 where the scanning ends coincide with each other, and thus a distortion that may occur in a region where the first display device 100-1 and the fourth display device 100-4 meet each other may be removed. As another example, the first display device 100-1 may scan the image from bottom to top and the fourth display device 100-4 may scan the image from top to bottom. That is, the edges of the first display device and the fourth display device 100-1 and 100-4 where the scanning of the respective images begins may coincide with each other. Accordingly, a distortion that may occur on a boundary between the first display device 100-1 and the fourth display device 100-4 may be removed.

Figure 8:
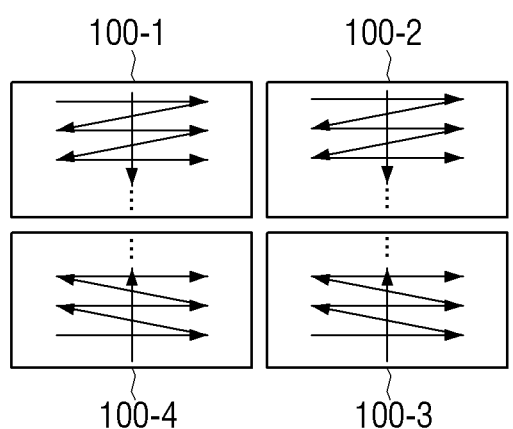

FIG. 8 is a diagram illustrating an example of scanning an image in a different direction according to an exemplary embodiment.

As described above, the display 130 may scan an image from a top of a screen to bottom of a screen or from the bottom to top, and may scan the image from left to right or from right to left. Accordingly, as illustrated in FIG. 8, in an example in which the first display device 100-1 scans the image from top to bottom while scanning the image from left to right, the fourth display device 100-4 may scan the image from bottom to top while scanning the image from left to right. Accordingly, screen inconsistency due to the scanning delay may be reduced. It should also be appreciated that regardless of lateral scanning direction, i.e., from left to right or from right to left, as long as the third and fourth display devices scan the image from bottom to top in a case in which the first and second display devices scan the image from top to bottom, the screen inconsistency due to the scanning delay may be reduced.

Figure 9:
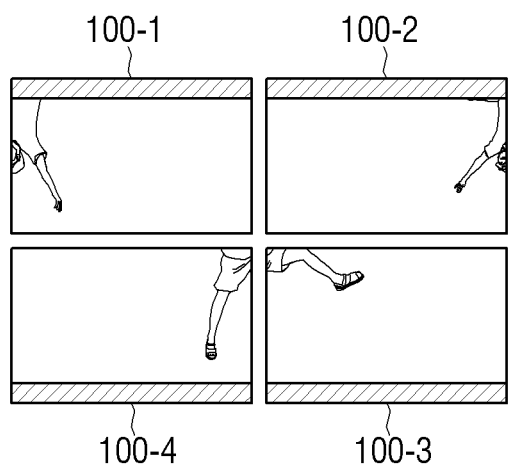
FIGS. 9 and 10 are diagrams illustrating a display system in which display devices are arranged to be inverted up and down according to exemplary embodiments.
Figure 10:
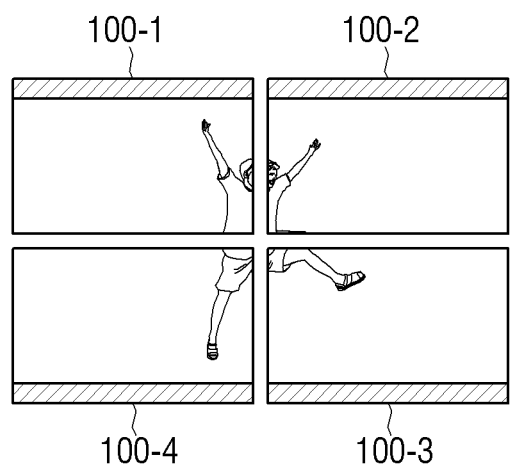

FIGS. 9 and 10 are diagrams illustrating a display system in which display devices are arranged upside down with respect to each other according to an exemplary embodiment.

According to one or more exemplary embodiments, display device 100 of the display system 1000 may be arranged so that a gap between the display devices is narrow, and may correspond to a size of a bezel of the display device 100. Because one side of the bezel of the display device 100 may be thicker than the other side of the bezel, the thicker side of the bezel may be arranged on the outer side of the display system 1000. Accordingly, in the case of the display system 1000 that includes four display devices, the display devices arranged on an upper side or a lower side may be arranged such that the displays on the upper side are upside down with respect to the displays on the lower side.

For example, FIG. 9 illustrates a case in which the upper display devices 100-1 and 100-2 are arranged upside down or inverted. In this example, if the display device 100 is arranged upside down (i.e., rotated by 180°), the image that is displayed may be inverted up and down and left and right. Accordingly, in order to display the input image as it is on the display system 1000, inverted images may be displayed on the display devices 100-1 and 100-2 that are inverted up and down. In this example, the inverted image may be an image inverted up and down and inverted right and left. Further, in order to display the inverted image, the display 130 may be a frame inversion display.

In the example of FIGS. 9 and 10, the display devices 100-1 and 100-2 arranged on an upper portion of the display system are inverted. In other words, the display devices 100-1 and 100-2 are positioned upside down. Accordingly, the display devices 100-1 and 100-2 may invert the images they display. In this example, the display devices 100-1 and 100-2 that are arranged on the upper side may display the inverted images, as illustrated in FIG. 10, and accordingly the input image may be displayed appropriately.

Figure 11:
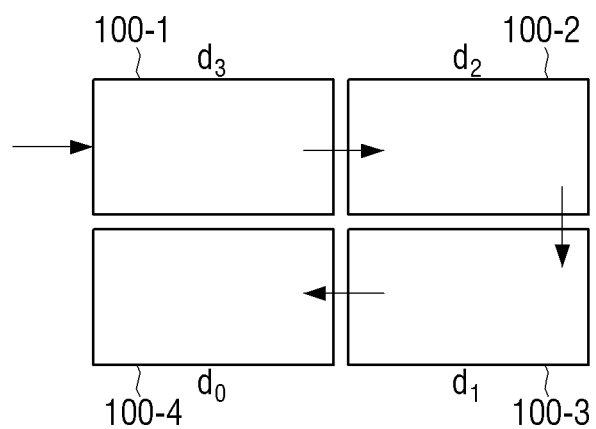
FIG. 11 is a diagram explaining delays according to arrangement positions of display devices according to an exemplary embodiment.

FIG. 11 is a diagram illustrating delays according to arrangement positions of display devices according to an exemplary embodiment.

In an example in which the display device 100 receives the input image in a chain manner, that is, in a case in which the first display device 100-1 receives the input image and sequentially transmits the input image to the second to fourth display devices 100-2 to 100-4, delays occur between the respective display devices.

Accordingly, the controller 140 of the display device 100-1 may set delay times in consideration of the arrangement positions of the respective display devices 100-1, 100-2, 100-3, and 100-4. For example, in a case in which an amount of time D is consumed whenever the image passes through one display device 100, the position delay time d3 of the first display device 100-1 may be set to D*3, the position delay time d2 of the second display device 100-2 may be set to D*2, and the position delay time d1 of the third display device 100-3 may be set to D*1. Here, the time D as described above may be any amount of time in which the input image is transmitted. Also, the arrangement positions (locations with respect to each other) of the respective display devices 100-1, 100-2, 100-3, and 100-4 may be input through the user interface 150 of the display device 100-1.

Figure 12:
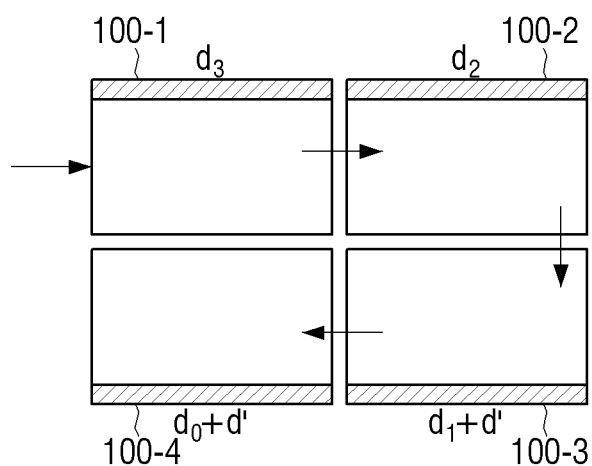
FIG. 12 is a diagram explaining delays according to an inversion of display devices according to an exemplary embodiment.

FIG. 12 is a diagram illustrating delays according to an inversion of display devices according to an exemplary embodiment.

Referring to FIG. 12, display devices 100-1 and 100-2 are inverted. Accordingly, delays occur in displaying the inverted images, and the images may be synchronized through addition of a specific delay time to the non-inverted display devices 100-3 and 100-4. For example, an amount of time required to display the inverted image on the display 130 may be D'. Accordingly, an inversion delay time D' may be added to the respective position delay times of the third and fourth non-inverted display devices 100-3 and 100-4.

In this example, the inversion of the display device 100 may be input through the user interface 150 or may be sensed through the sensor 160. For example, if an inversion mode is selected through the user interface 150, the display device 100 in which the inversion mode is selected may recognize the inversion and may display the inverted image. As another example, if the inversion is sensed through the sensor 160, the display device 100 may recognize the inversion and may display the inverted image. For example, the sensor 160 may be composed of a geomagnetic sensor that can sense the inversion of the display device 100.

Further, the delay times D and D' are predetermined values, and the controller 140 may automatically calculate and set the position delay times based on the arrangement positions of the respective display devices 100 and whether the display device 100 is inverted. However, in an example in which a specific delay time is input through the user interface 150 by a user, the delay time that is input by the user may be preferentially applied, but is not limited thereto.

Figure 13:
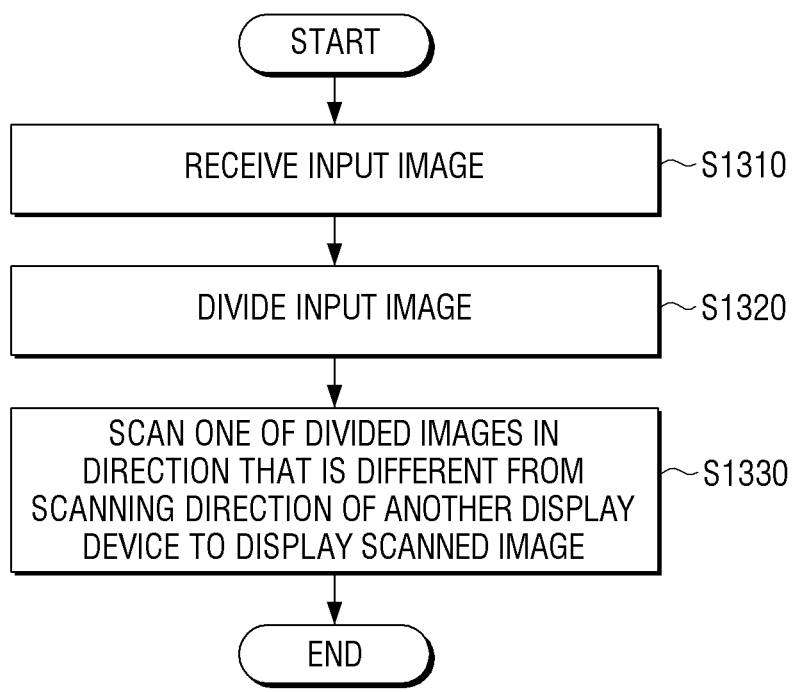
FIG. 13 is a flowchart illustrating a display method of a display device according to an exemplary embodiment.

FIG. 13 is a flowchart illustrating a display method of a display device according to an exemplary embodiment.

Referring to FIG. 13, a display device 100 receives an input image, for example, from an external device or another display device (S1310). For example, the respective display devices 100 may directly receive a divided input image from the external device, or one display device 100 may receive the input image from the external device and the other display devices 100 may sequentially receive the input image from the display device. Further, the display device 100 divides the received input image (S1320). For example, the input image may be divided in consideration of the number of display devices and their arrangement on the display system 1000.

Further, the display device 100 scans one of the divided images in a direction that is different from the direction in which an adjacent display device scans a respective image to display the scanned image (S1330). For example, when the other adjacent display device scans the image from bottom to top, the display device 100 may display the image by scanning the image from top to bottom. Accordingly, an image distortion may be prevented at a boundary region between the respective display devices.

Figure 14:
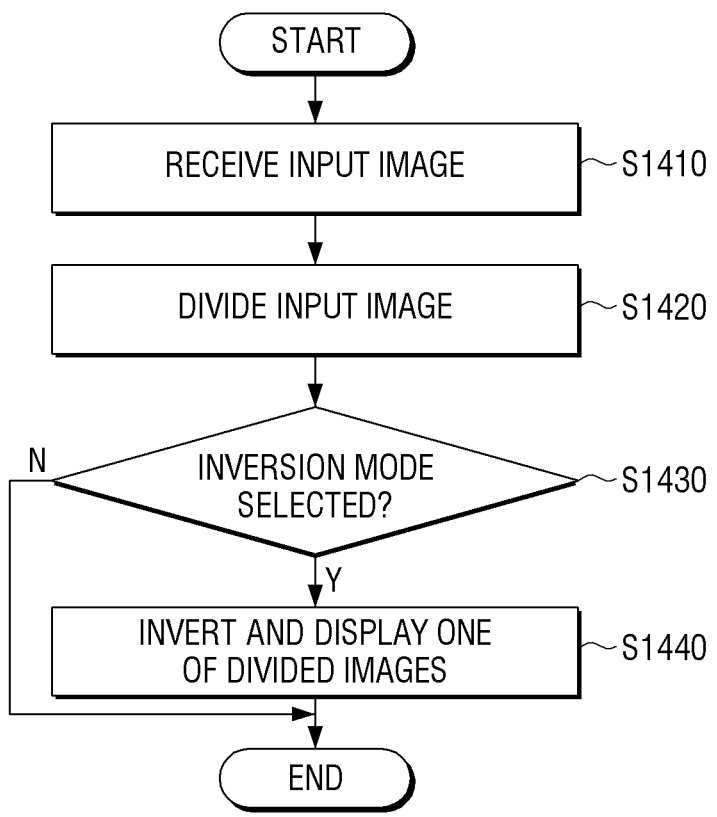
FIGS. 14 and 15 are flowcharts illustrating a method for displaying an inverted image according to an inversion of display devices according to exemplary embodiments.
Figure 15:
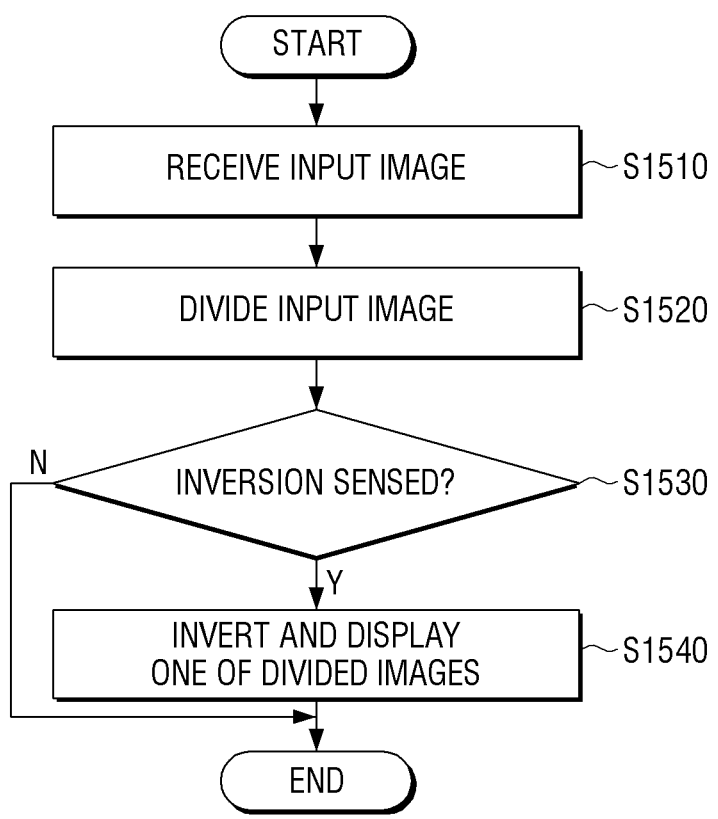

FIGS. 14 and 15 are flowcharts illustrating methods for displaying an inverted image according to an inversion of display devices 100 according to exemplary embodiments.

Referring to FIGS. 14 and 15, the display device 100 receives the input image (S1410 and S1510), and divides the received image (S1420 and S1520). Thereafter, the display device 100 may select an inversion mode (S1430 in FIG. 14), or if the inversion is sensed (S1530 in FIG. 15), the display device 100 may invert and display one of the divided images (S1440 and S1540).

Figure 16:
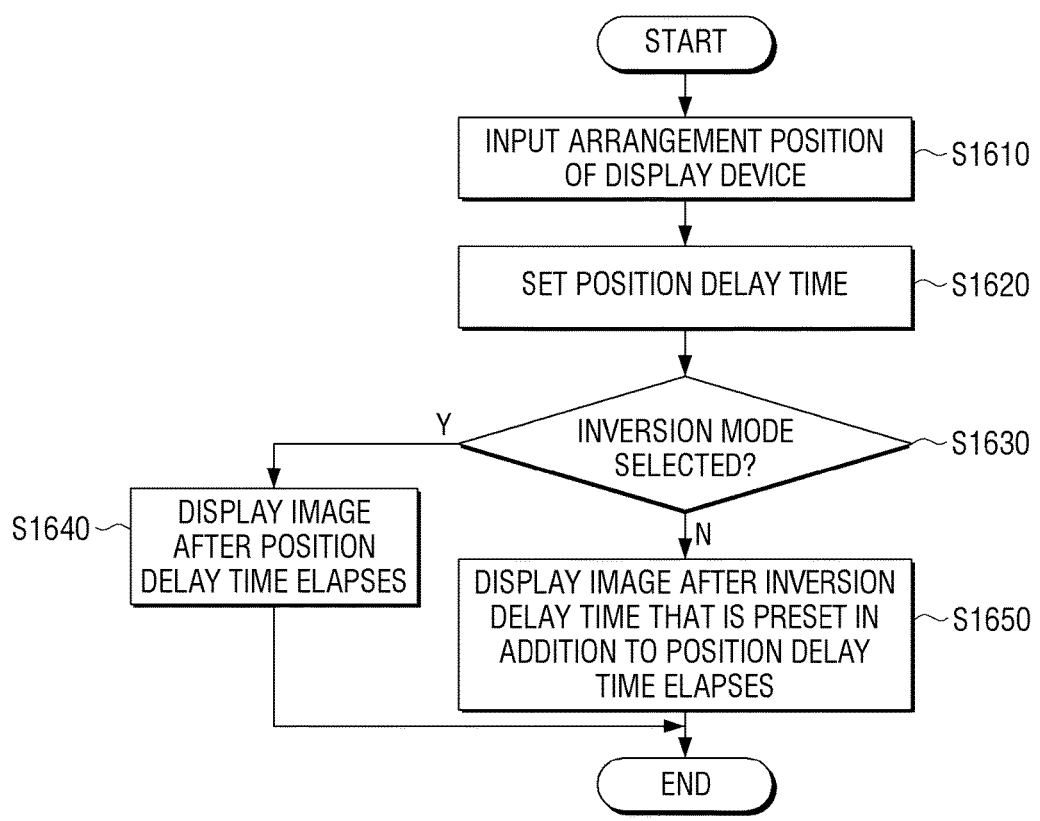
FIGS. 16 and 17 are flowcharts illustrating a method of a display device displaying an image after a delay according to an inversion of the display device according to exemplary embodiments.
Figure 17:
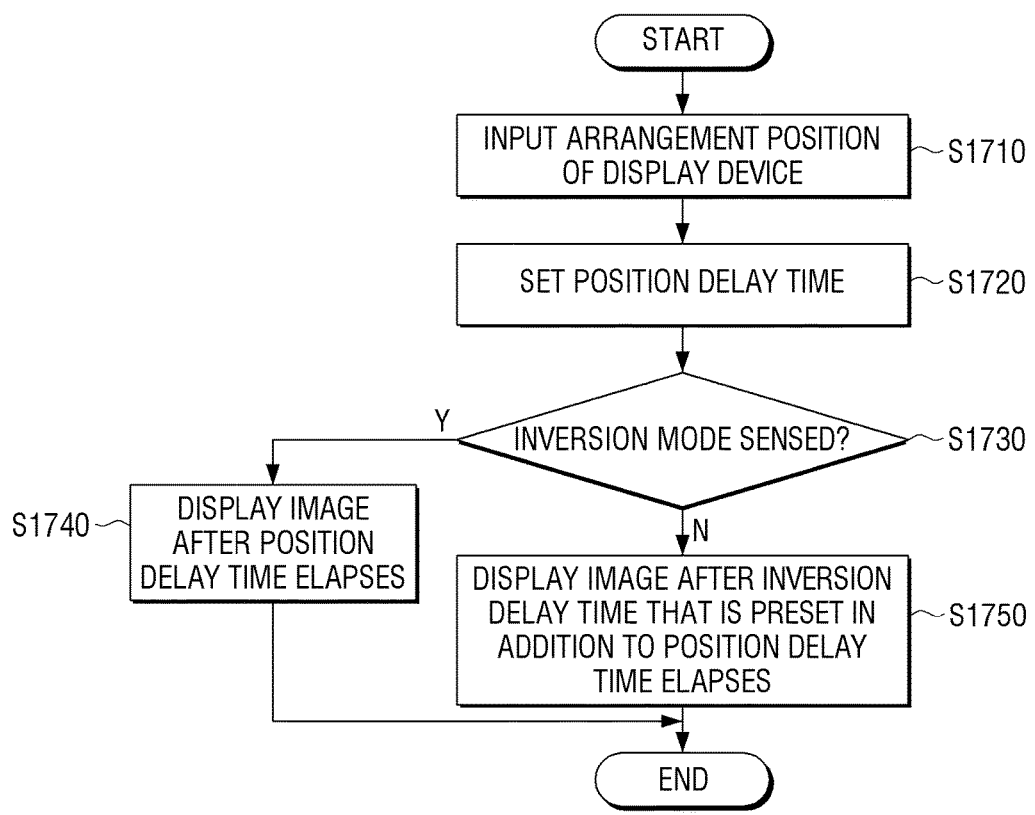

FIGS. 16 and 17 are flowcharts illustrating an arrangement position of a display device and a delay according to an inversion of the display device according to exemplary embodiments.

Referring to FIGS. 16 and 17, the display device 100 receives an input of the arrangement position of the display device (S1610 and S1710). For example, a user may input the arrangement position of the display device through a user interface, and the display device may recognize coordinates at which the display device is positioned in the display system.

If the arrangement position of the display device is input, the display device sets the position delay time based on the arrangement position of the display device (S1620 and S1720). For example, the position delay time may be automatically set using a predetermined delay value and the arrangement position of the display device, or may be input by a user.

If the inversion mode is selected (S1630 in FIG. 16) or the inversion is sensed by the sensor (S1730 in FIG. 17), the display device displays the image (S1650 and S1750) after the inversion delay time and the position delay time elapses. However, if the inversion mode is not selected or the inversion is not sensed by the sensor, the display device displays the image (S1640 and S1740) after the position delay time elapses. Accordingly, the delay based on the arrangement position and the inversion of the display device may be compensated for, and thus, the screens that are displayed on the display devices 100 of the display system 1000 may be synchronized.

Figure 18:
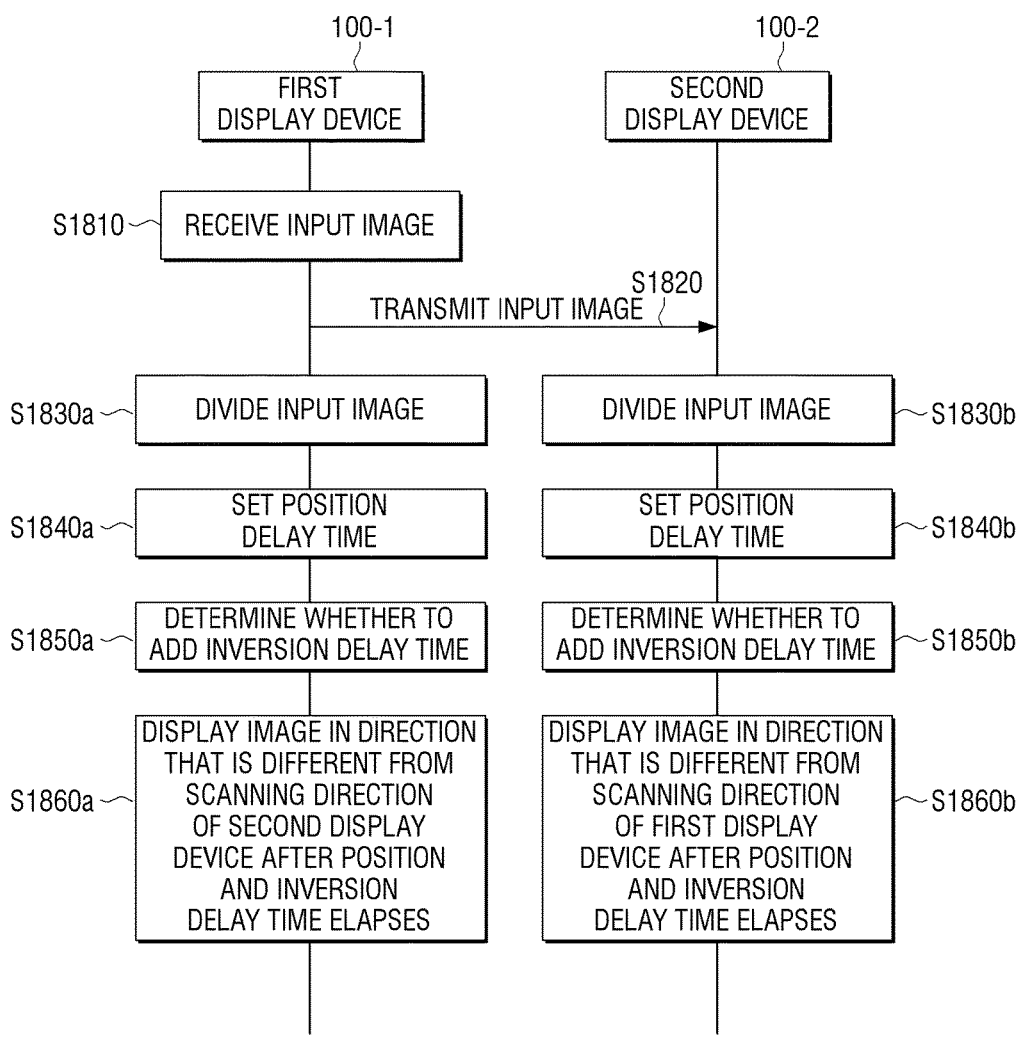
FIG. 18 is a sequential diagram illustrating a display method according to an exemplary embodiment.

FIG. 18 is a sequential diagram illustrating a display method according to an exemplary embodiment of the present disclosure.

Referring to FIG. 18, a display system includes first and second display devices 100-1 and 100-2. In this example, the first display device 100-1 receives an input image from an external device (S1810). The first display device 100-1 then transmits the received input image to the second display device (S1820).

The first and second display devices 100-1 and 100-2 divide the received input image base on the number and the arrangement of the display devices 100 within the display system 1000 (S1830a and S1830b). Further, the first and second display devices 100-1 and 100-2 may set position delay times based on the input arrangement positions of the display devices 100 (S1840a and S1840b).

In a case in which the second display device 100-2 is inverted, the first display device 100-1 may additionally add an inversion delay time to a position delay time in order to compensate for a delay that is due to the inversion (S1850a). Through this, the images that are displayed on the first display device 100-1 and the second display device 100-2 can be synchronized.

Further, the first display device 100-1 may display the image by scanning the image in a direction that is different from the scanning direction of the second display device after the position delay time and the inversion delay time have elapsed (S1860a). Further, the second display device 100-2 may display the image by scanning the image in a direction that is different from the scanning direction of the first display device after the position delay time and the inversion delay time have elapsed (S1860b). For example, if the second display device scans the image from top to bottom, the first display device may scan the image from bottom to top. As another example, if the second display device scans the image from bottom to top, the first display device may scan the image from top to bottom. Through this, the frames at edges on which the display devices are arranged and at which the upper side and the lower side of the respective devices come in contact with each other can be synchronized, and thus, image inconsistency due to the scanning delay may be reduced.

In addition, based on the contents as described above in the examples with reference to FIGS. 1 to 12, various display methods may be performed. However, because the display methods according to the various exemplary embodiments have already been described, a duplicate explanation thereof is omitted.

Figure 19:
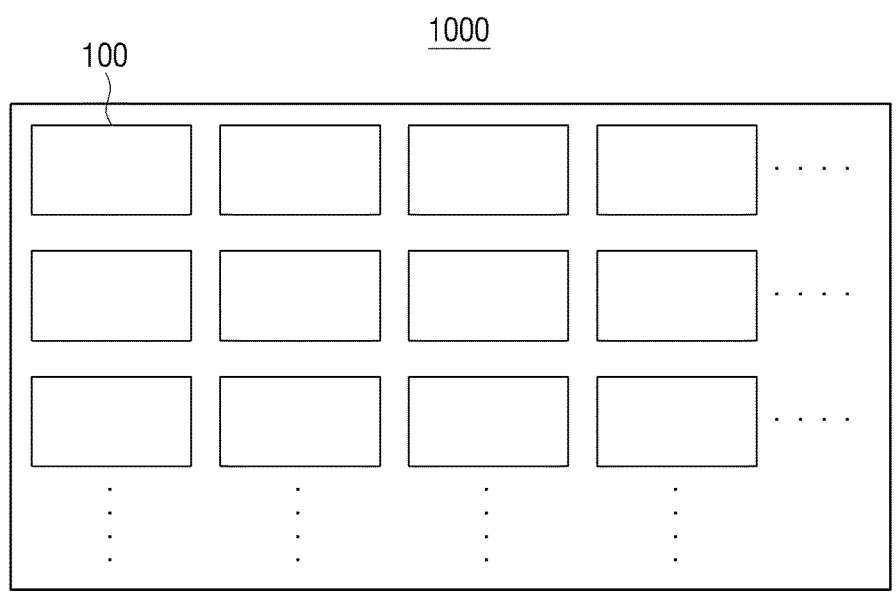
FIG. 19 is a diagram illustrating a display system including a plurality of display devices according to an exemplary embodiment.

On the other hand, although it is described that four display devices 100-1, 100-2, 100-3, and 100-4 are used in the display system 1000 according to this embodiment, this is merely for convenience in explanation. As another example, and as illustrated in FIG. 19, the number of display devices included in the display system 1000 is not limited thereto. For example, the display system 1000 may include one, two, or more than two display devices. For example, as shown in FIG. 19, the display devices 100 may be arranged in a two-dimensional array as one non-limiting example in which display devices are arranged in N columns and M rows to generate an array of (N×M) display devices.

For example, the display system 1000 may be a multi-screen display, a multi-panel display, a multi-monitor display, a video wall, matrix, grid, and the like. Although not shown, the display system 1000 may include a controller such as controller 140 shown in FIG. 3 that is included within one or more of the display devices, or may be included in an external device that connects to one or more of the display devices via a wire or wirelessly. The controller may control the images that are displayed by the display system 1000. For example, the controller may control the timing, the scanning (start and end points, and direction), and the like, performed by each display panel within the display system 1000, in order to prevent image distortion from occurring between the images displayed by the plurality of display devices.

The display method of the display device that is included in the display system according to various exemplary embodiments as described above may be stored in a non-transitory computer readable medium. Such a non-transitory computer readable medium may be mounted on various devices to be used.

The non-transitory computer readable medium is not a medium that stores data for a short period, such as a register, a cache, or a memory, but refers to a medium which permanently or semi-permanently stores data and is readable by a device. Specifically, programs for performing the various methods as described above may be stored and provided in the non-transitory computer readable medium, such as, a CD, a DVD, a hard disc, a Blu-ray disc, a USB, a memory card, and a ROM.

Accordingly, by installing and/or executing the above-described programs in a display device, the display system that is composed of display devices having different scanning directions can be implemented.

While the present disclosure has been shown and described with reference to certain exemplary embodiments thereof, it should be understood by those skilled in the art that various changes in form and detail may be made therein without departing from the spirit and scope of the present disclosure, as defined by the appended claims.

What is claimed is:

1. A display device from among a plurality of display devices included in a display system, the display device comprising:
   a communication interface configured to receive an input image;
   an image processor configured to process an image of the input image to be displayed;
   a display configured to display the processed image; and
   a controller configured to transmit the input image to an adjacent display device provided separately from the display device in the display system through the communication interface, and control the display to display the processed image in a scanning direction based on an arrangement position of the display device within the display system, wherein the scanning direction of the processed image on the display is opposite to a scanning direction of an image on the adjacent display device, and wherein the processed image is not inverted when the processed image is displayed in the scanning direction opposite to the scanning direction of the image on the adjacent display device.

2. The display device as claimed in claim 1, wherein the display is configured to divide the processed image into a plurality of regions, and has a first scan mode for updating the divided regions in a direction from top to bottom of the display and a second scan mode for updating the divided regions in a direction from bottom to top of the display, and the controller is configured to control the display to display the processed image in the second scan mode.

3. The display device as claimed in claim 1, wherein the controller is configured to, in response to the adjacent display device rotationally processing a respective image displayed by the adjacent display device, control the display to display the image processed by the image processor with a delay for a predetermined amount of time.

4. The display device as claimed in claim 1, further comprising a user interface configured to receive an input of a user identifying an arrangement position of the display device in the display system, wherein the controller is configured to control the display to display the processed image in the scanning direction that is opposite to the scanning direction of the adjacent display device based on arrangement position.

5. The display device as claimed in claim 1, further comprising a sensor configured to sense an arrangement direction of the display device, wherein the image processor is configured to rotationally process the image to be displayed on the display device according to the sensed arrangement direction.

6. The display device as claimed in claim 1, wherein the controller is configured to set a position delay time based on the arrangement position of the display device in the display system, and, in response to the communication interface receiving the input image, the controller is configured to control the display to display the processed image after the position delay time elapses.

7. The display device as claimed in claim 1, wherein the communication interface is configured to receive the input image from another adjacent display device that is disposed adjacent to the display device in the display system.

8. The display device of claim 1, wherein the adjacent display device is disposed directly above or directly below the display device within the display system.

9. A display system comprising:

a first display device including a first display and a first communication interface and configured to display an upper region of an input image on the first display; and a second display device which includes a second display and a second communication interface and is arranged below the first display device and configured to display, on the second display, a lower region of the input image that is on a lower portion of the input image than the upper region, wherein a scanning direction of the upper region of the input image on the first display of the first display device and a scanning direction of the lower region of the input image on the second display of the second display device are opposite to each other in mutually vertical directions, and wherein each of images on the first display of the first display device and the second display of the second display device is not inverted when the images are displayed in the scanning directions opposite to each other, and wherein the first display device is further configured to control the first communication interface to transmit the input image to the second display device via the second communication interface of the second display device.

10. The display system as claimed in claim 9, wherein the first display device is arranged at a position rotated 180° relative to the second display device and is configured to rotationally process the image to be displayed on the first display of the first display device by inverting the image.

11. A display method of a display device from among a plurality of display devices included in a display system, the display method comprising:

receiving an input image via a first communication interface of the display device;

processing an image of the input image to be displayed; and transmitting the input image to an adjacent display device via the first communication interface, wherein the adjacent display device is disposed adjacent to and outside the display device in the display system, displaying, on the display device, the processed image in a scanning direction that is opposite to a scanning direction of an image of the input image on the adjacent display device based on an arrangement position of the display device within the display system, wherein the processed image is not inverted when the processed image is displayed in the scanning direction opposite to the scanning direction of the image on the adjacent display device.

12. The display method as claimed in claim 11, wherein the displaying comprises:

dividing the processed image into a plurality of regions, wherein the display device has a first scan mode for updating the divided regions in a direction from top to bottom of the display and a second scan mode for updating the divided regions in a direction from bottom to top of the display; and displaying the processed image in the second scan mode.

13. The display method as claimed in claim 11, wherein the displaying comprises, in response to the adjacent display device rotationally processing a respective image, displaying the image processed with a delay for a predetermined time.

14. The display method as claimed in claim 11, further comprising receiving an input of an arrangement position of the display device within the display system, wherein the displaying comprises displaying the processed image in the scanning direction that is opposite to the scanning direction of the adjacent display device based on the received arrangement position.

15. The display method as claimed in claim 11, further comprising sensing an arrangement direction of the display device, wherein the processing comprises rotationally processing the image to display the image on the display device according to the sensed arrangement direction.

16. The display method as claimed in claim 11, wherein the displaying comprises setting a position delay time based on the arrangement position of the display device within the display system, and, in response to the input image being received, displaying the processed image after the position delay time elapses.

17. The display method as claimed in claim 11, wherein the receiving comprises receiving the input image from another adjacent display device that is disposed adjacent to the display device in the display system.

18. A non-transitory computer readable medium having recorded thereon a computer program that is executable by a computer to perform the method of claim 11.

* * * * *